James L. Plimpton's 2. Sheets. Sheet No. 1.
Impt. in Skates.
4292
REISSUED MAR 7 1871
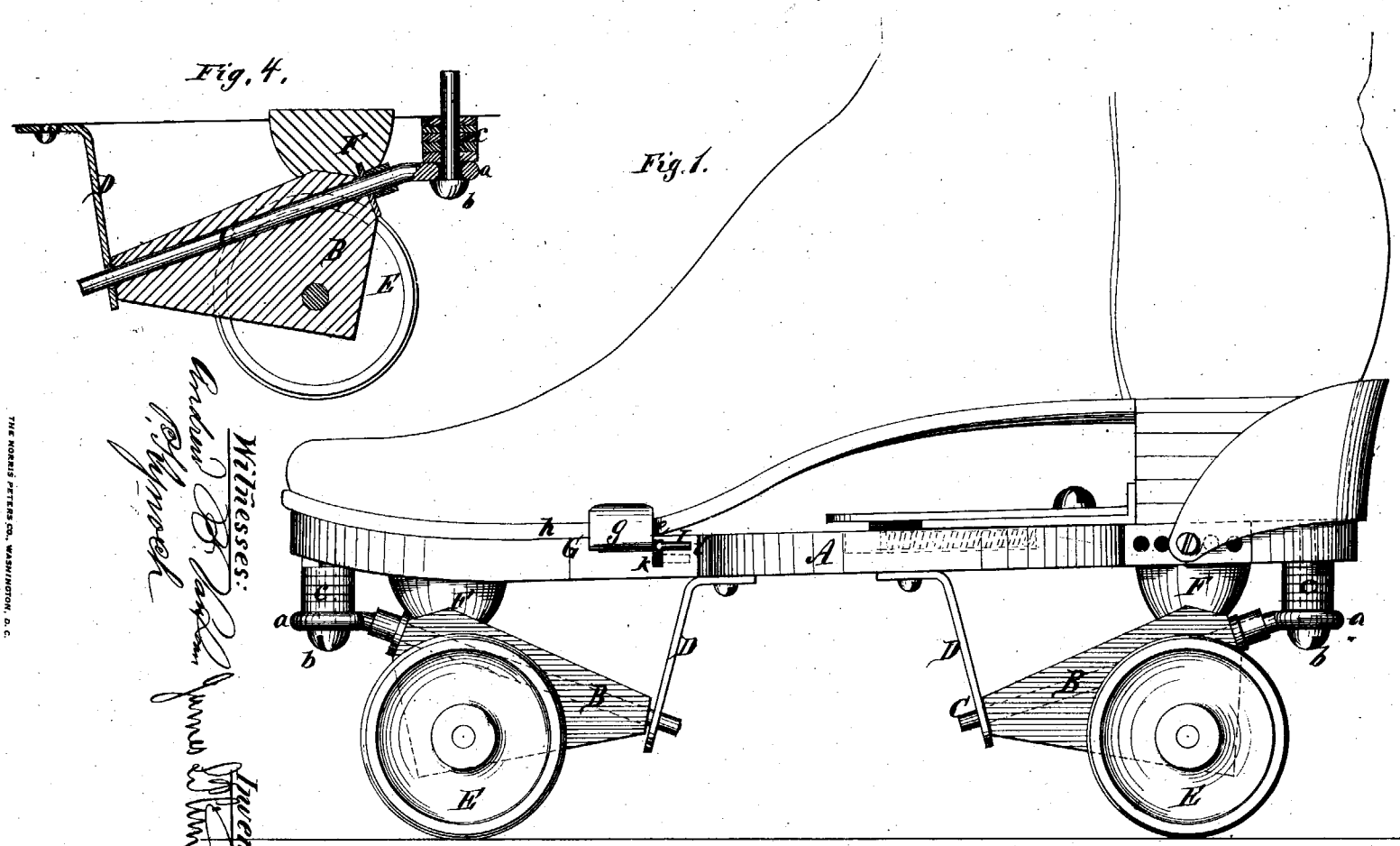
Witnesses:
Andrew B. Parker
P. Slynoch
Inventor.
James L. Plimpton
THE NORRIS PETERS CO., WASHINGTON, D. C.

James L. Plimpton's
Impt. in Skates.
Sheet No. 2.
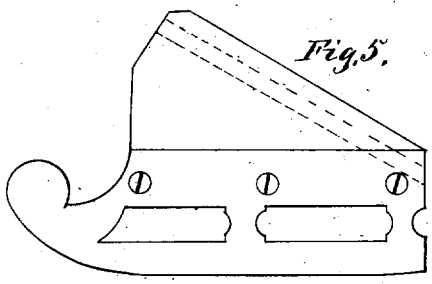
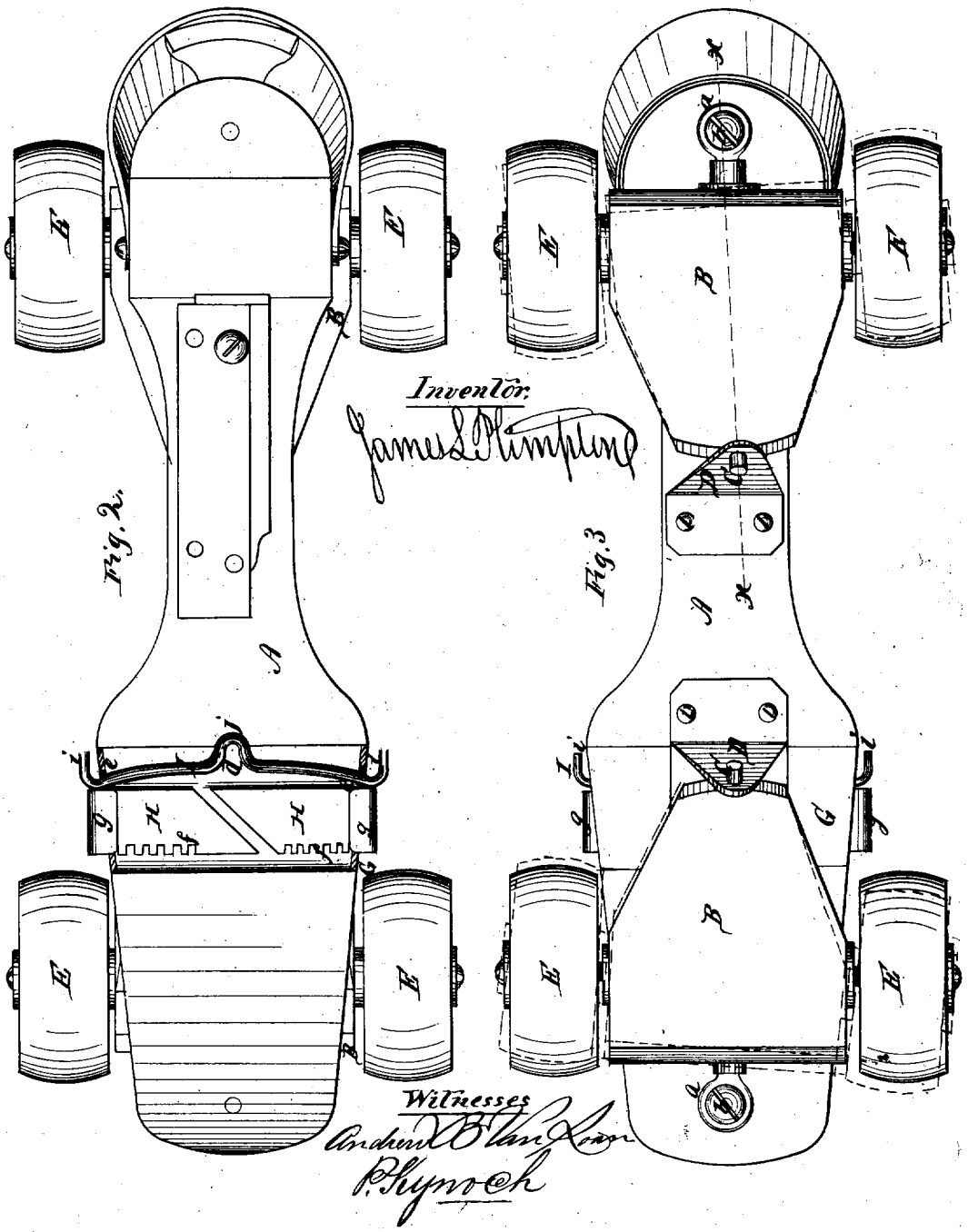
THE NORRIS PETERS CO., WASHINGTON, D. C.

UNITED STATES PATENT OFFICE.

JAMES L. PLIMPTON, OF NEW YORK, N. Y.

IMPROVEMENT IN SKATES.

Specification forming part of Letters Patent No. 37,305, dated January 6, 1863; reissue No. 3.906, dated April 5, 1870; reissue No. 4,292, dated March 7, 1871.

DIVISION A.

*To all whom it may concern:*

Be it known that I, JAMES L. PLIMPTON, of New York city, in the county and State of New York, have invented a new and useful Improvement in Skates; and I do hereby declare that the following is a full, clear, and exact description thereof, which will enable others skilled in the art to make and use the same, reference being had to the accompanying drawings forming part of this specification.

My invention consists in constructing a skate so that the transverse rocking of the skater's foot will cause the rollers or runners to cramp or change their horizontal position, so as to run the skate straight or in curves to the right or left, and at the same time the rollers or runners remain with their full bearings upon the floor or ice, to whatever degree they may be swung oblique while turning curves, thus enabling the skater to steer or guide the skate as desired and to incline his body from the center of gravity while turning curves.

In the accompanying drawings, Figure 1 represents a side view of a skate having my improvements. Fig. 2 is a plan or top view of the same. Fig. 3 is an elevated plan view of the same. Fig. 4 is a detail longitudinal section of a portion of the same, the plane of section being indicated by the line *x x*, Fig. 3. Fig. 5 is a detail side view of one of the runners.

Similar letters of reference indicate corresponding parts.

A in the drawing represents the foot-support or sole of the skate. To the under side of the foot-support are pivoted, by longitudinal inclined rods C C, two hangers or blocks, B B, of suitable shape. The rods C are fastened to the under side of the foot-support, near the ends of the same, in inclined positions, so that their inner ends are lower than the outer. They are held in place by ears or plates D projecting downward from the foot-support, and by screws *b b* secured into said foot-supports. The screws *b* fit through eyes *a* formed at the upper ends of the rods C. Washers *c c* are interposed between the said eyes *a* and the foot-support. By increasing or decreasing the number or thickness of the said washers, or by changing their position upon the screws, the inclination of the rod C can be regulated. E E are rollers hung on the sides of the hangers, one roller on each side of each hanger. F F are springs or cushions interposed between the hangers and foot-support, or attachment thereof, said springs aiding to support the foot when the weight rests upon the skate and also when the weight is removed, to bring the parts to place and prevent the same from rattling or working too freely.

It will be seen that as the hangers are hung on an inclined pivot, or its equivalent, which is rigidly connected with the foot-support, the rocking motion of the latter will carry the higher end of said pivot less far away from the central line of the skate than the lower end of the same, and hence, by attaching the hangers so as to vibrate in an oblique direction, the rocking of the foot-support will cause the rollers to move horizontally, as shown by red outlines in Fig. 3, where it will be seen that the rollers upon one side of the skate are nearer together than they are upon the other. The aforementioned horizontal motion imparted to the hanger by the rocking of the foot-support does, however, not affect the bearing of the rollers—that is to say, they remain with their full edges on the floor to whatever degree they may be swung to the side, and thus the skate is made to resist the centrifugal force of the skater's body while turning curves.

The inclination of the pivot C causes, as was shown above, the swinging of the hangers. The more the pivot is inclined the greater will, consequently, be the swing of the hangers at a certain inclination of the foot-support. The adjustment of the said pivot, by means of the washers or their equivalents, serves, therefore, to regulate the curve described by the skate at a given inclination of the foot-support.

It will also be seen that when the foot-support is sufficiently rocked or canted to rest upon the hangers B B it prevents the foot of the skater from rocking further.

To adapt my invention to ice-skating, it is only necessary to substitute runners in place of rollers, their relative position being regulated in the same manner as when rollers are applied.

By this means of attaching or applying the rollers or runners to the foot-support, or its equivalent, it will be seen that when the foot of the wearer of the skate is inclined, the foot-support A will also be inclined, and the hangers B B, in consequence of being fitted on the inclined rods C C, will "cramp" or turn so as to cause the skate to describe a curve. Hence, in order to turn in either direction, the skater is only required to incline his foot in the direction he desires to move, and the rollers or runners will be moved or cramped in proper position to describe a curve according to the inclination of the foot.

I do not confine myself to the precise arrangement, as herein shown and described, for cramping or attaching the rollers or runners, as many variations and modifications may be made therein without deviating from the main features of my invention.

Having thus described my invention, what I claim as new, and desire to secure by Letters Patent, is—

A skate constructed with rollers or runners that cramp, arranged and operated substantially in the manner and for the purposes as herein set forth.

JAMES L. PLIMPTON.

Witnesses:
W. H. McCLURE,
JOHN DUFFY.